(12) United States Patent
Schowengerdt et al.

(10) Patent No.: US 11,402,636 B2
(45) Date of Patent: Aug. 2, 2022

(54) METHOD AND SYSTEM FOR WAVEGUIDE PROJECTOR WITH WIDE FIELD OF VIEW

(71) Applicant: Magic Leap, Inc., Plantation, FL (US)

(72) Inventors: Brian T. Schowengerdt, Seattle, WA (US); Mathew D. Watson, Bellevue, WA (US); Charles David Melville, Camano Island, WA (US)

(73) Assignee: Magic Leap, Inc., Plantation, FL (US)

( * ) Notice: Subject to any disclaimer, the term of this patent is extended or adjusted under 35 U.S.C. 154(b) by 35 days.

(21) Appl. No.: 17/034,976

(22) Filed: Sep. 28, 2020

(65) Prior Publication Data

US 2021/0096375 A1 Apr. 1, 2021

Related U.S. Application Data

(63) Continuation of application No. 16/514,734, filed on Jul. 17, 2019, now Pat. No. 10,823,968, which is a
(Continued)

(51) Int. Cl.
| | | |
|---|---|---|
| *G02B 27/01* | (2006.01) | |
| *G02B 27/00* | (2006.01) | |
| *F21V 8/00* | (2006.01) | |

(52) U.S. Cl.
CPC ....... *G02B 27/0172* (2013.01); *G02B 6/0016* (2013.01); *G02B 27/0081* (2013.01);
(Continued)

(58) Field of Classification Search
CPC .................. G02B 6/0016; G02B 6/008; G02B 2027/0123
See application file for complete search history.

(56) References Cited

U.S. PATENT DOCUMENTS

| | | |
|---|---|---|
| 9,019,615 B2 | 4/2015 | Travis |
| 9,052,414 B2 | 6/2015 | Travis et al. |

(Continued)

FOREIGN PATENT DOCUMENTS

| | | |
|---|---|---|
| AU | 2018239357 | 9/2019 |
| CA | 3056247 | 9/2018 |

(Continued)

OTHER PUBLICATIONS

EP18771101.5, "Extended European Search Report", dated Mar. 9, 2020, 10 pages.

(Continued)

*Primary Examiner* — Sung H Pak
(74) *Attorney, Agent, or Firm* — Kilpatrick Townsend & Stockton LLP

(57) ABSTRACT

A waveguide display disposed in glasses includes a first pupil expander assembly operable to project a first image defined by a first field of view, and a second pupil expander assembly disposed adjacent the first pupil expander assembly and operable to project a second image defined by a second field of view different from the first field of view. The first pupil expander assembly is operable to emit light at a first non-zero angle with respect to a first emission plane associated with the first pupil expander assembly. The second pupil expander assembly is operable to emit light at a second non-zero angle with respect to a second emission plane associated with the second pupil expander assembly. The first non-zero angle is opposite to the second non-zero angle.

18 Claims, 7 Drawing Sheets

Related U.S. Application Data continuation of application No. 15/927,821, filed on Mar. 21, 2018, now Pat. No. 10,394,030.

(60) Provisional application No. 62/474,493, filed on Mar. 21, 2017.

(52) U.S. Cl.
CPC ............ *G02B 6/008* (2013.01); *G02B 6/0036* (2013.01); *G02B 6/0058* (2013.01); *G02B 2027/0123* (2013.01); *G02B 2027/0178* (2013.01)

(56) References Cited

U.S. PATENT DOCUMENTS

| | | | |
|---|---|---|---|
| 9,164,290 | B2 | 10/2015 | Robbins et al. |
| 9,274,339 | B1 | 3/2016 | Brown et al. |
| 9,671,615 | B1 | 6/2017 | Vallius et al. |
| 9,674,413 | B1 | 6/2017 | Tiana et al. |
| 10,394,030 | B2 | 8/2019 | Schowengerdt et al. |
| 10,823,968 | B2 | 11/2020 | Schowengerdt et al. |
| 2006/0132914 | A1 | 6/2006 | Weiss et al. |
| 2010/0296163 | A1* | 11/2010 | Saarikko ............ G02B 27/0081 359/567 |
| 2010/0328794 | A1 | 12/2010 | Levola et al. |
| 2011/0019874 | A1 | 1/2011 | Jarvenpaa et al. |
| 2014/0218801 | A1 | 8/2014 | Simmonds et al. |
| 2015/0346495 | A1 | 12/2015 | Welch et al. |
| 2016/0026253 | A1* | 1/2016 | Bradski ................ H04N 13/167 345/8 |
| 2016/0116739 | A1 | 4/2016 | Tekolste et al. |
| 2017/0059879 | A1 | 3/2017 | Vallius |
| 2017/0061647 | A1 | 3/2017 | Starner et al. |
| 2018/0275411 | A1 | 9/2018 | Schowengerdt et al. |
| 2020/0004021 | A1 | 1/2020 | Schowengerdt et al. |

FOREIGN PATENT DOCUMENTS

| | | |
|---|---|---|
| CN | 102741727 | 10/2012 |
| CN | 105988219 | 10/2016 |
| CN | 106483660 A | 3/2017 |
| CN | 110431471 | 11/2019 |
| EP | 3602174 | 2/2020 |
| EP | 3602174 | 4/2020 |
| JP | 2014132328 A | 7/2014 |
| JP | 2020514830 | 5/2020 |
| KR | 20190126410 | 11/2019 |
| WO | 2009077802 | 6/2009 |
| WO | 2018175546 A1 | 9/2018 |

OTHER PUBLICATIONS

PCT/US2018/023510, "International Preliminary Report on Patentability", dated Oct. 3, 2019, 8 pages.
PCT/US2018/023510, "International Search Report and Written Opinion Received", dated Jun. 11, 2018, 9 pages.
U.S. Appl. No. 15/927,821, Non-Final Office Action, dated Oct. 5, 2018, 17 pages.
U.S. Appl. No. 15/927,821, Notice of Allowance, dated Apr. 23, 2019, 8 pages.
U.S. Appl. No. 16/514,734, Non-Final Office Action, dated Mar. 2, 2020, 9 pages.
U.S. Appl. No. 16/514,734, Notice of Allowance, dated Jun. 29, 2020, 7 pages.
IN201947035197, "First Examination Report", dated Aug. 30, 2021, 7 pages.
Chinese Application No. 201880019689.9, Office Action dated Apr. 23, 2021, 8 pages (6 pages of Original Document and 2 pages of English Translation).
Application No. CN201880019689.9, Office Action and English Translation, dated Feb. 8, 2022, 6 pages.
Application No. JP2019-551615, Office Action and English Translation, dated Feb. 24, 2022, 12 pages.

* cited by examiner

METHOD AND SYSTEM FOR WAVEGUIDE PROJECTOR WITH WIDE FIELD OF VIEW

CROSS-REFERENCES TO RELATED APPLICATIONS

This application is a continuation of U.S. patent application Ser. No. 16/514,734, filed on Jul. 17, 2019, now U.S. Pat. No. 10,823,968, issued on Nov. 3, 2020, entitled "SYSTEM FOR WAVEGUIDE PROJECTOR WITH WIDE FIELD OF VIEW," which is a continuation of U.S. patent application Ser. No. 15/927,821, filed on Mar. 21, 2018, now U.S. Pat. No. 10,394,030, issued on Aug. 27, 2019, entitled "SYSTEM FOR WAVEGUIDE PROJECTOR WITH WIDE FIELD OF VIEW," which is a non-provisional of and claims the benefit of and priority to U.S. Provisional Patent Application No. 62/474,493, filed on Mar. 21, 2017, entitled "METHOD AND SYSTEM FOR WAVEGUIDE PROJECTOR WITH WIDE FIELD OF VIEW," the disclosures of which are hereby incorporated by reference in their entireties for all purposes.

BACKGROUND OF THE INVENTION

Modern computing and display technologies have facilitated the development of systems for so called "virtual reality" or "augmented reality" experiences, wherein digitally reproduced images or portions thereof are presented to a viewer in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the viewer.

Despite the progress made in these display technologies, there is a need in the art for improved methods and systems related to augmented reality systems, particularly, display systems.

SUMMARY OF THE INVENTION

The present invention relates generally to methods and systems related to projection display systems including wearable displays. More particularly, embodiments of the present invention provide methods and systems that have an extended field of view in comparison with conventional systems. The invention is applicable to a variety of applications in computer vision and image display systems.

According to an embodiment of the present invention, a waveguide display disposed in glasses is provided. The waveguide display includes a first pupil expander assembly operable to project a first image defined by a first field of view. The waveguide display also includes a second pupil expander assembly disposed adjacent the first pupil expander assembly and operable to project a second image defined by a second field of view different from the first field of view. The field of view and the second field of view can be tiled or a portion of the first field of view can overlap with a portion of the second field of view.

In an embodiment, the first pupil expander assembly and the second pupil expander assembly are disposed in a right lens frame of the glasses. The right lens frame has a nasal region, a peripheral region, and a center disposed between the nasal region and the peripheral region. The first field of view is centered at a position between the center and the nasal region. The second field of view is centered at a position between the center and the peripheral region. Furthermore, the waveguide display can also include a third pupil expander assembly operable to project the first image defined by a third field of view and a fourth pupil expander assembly disposed adjacent the third pupil expander assembly and operable to project the second image defined by a fourth field of view different from the third field of view. In this case, the third pupil expander assembly and the fourth pupil expander assembly can be disposed in a left lens frame of the set of glasses.

According to another embodiment of the present invention, a waveguide display disposed in glasses is provided. The waveguide display includes a first diffractive input waveguide operable to receive input data from a first projector and a second diffractive input waveguide operable to receive input data from a second projector. The waveguide display also includes a diffractive output waveguide optically coupled to the first diffractive input waveguide and the second diffractive input waveguide and having a central normal. The diffractive output waveguide is operable to direct image data associated with the first projector toward a first field of view displaced with respect to the central normal and direct image data associated with the second projector toward a second field of view displaced with respect to the central normal.

According to a specific embodiment of the present invention, a waveguide display disposed in glasses is provided. The waveguide display includes a first diffractive input waveguide operable to receive input data from a first projector and a second diffractive input waveguide operable to receive input data from a second projector. The waveguide display also includes a diffractive output waveguide optically coupled to the first diffractive input waveguide and the second diffractive input waveguide. The diffractive output waveguide is operable to form a first image beam having a first wavefront characterized by a first optical power and form a second image beam having a second wavefront characterized by a second optical power different from the first optical power.

In an embodiment, the waveguide display further includes a wavefront adjustment lens integrated with the waveguide display and a correction lens integrated with the waveguide display. The wavefront adjustment lens can be a negative lens and the correction lens can be a positive lens. As an example, the waveguide display can be characterized by a world side and a user side and the first image beam and the second image beam can be directed toward the user side, the wavefront adjustment lens can be disposed on the user side, and the correction lens can be disposed on the world side.

Numerous benefits are achieved by way of the present invention over conventional techniques. For example, embodiments of the present invention provide methods and systems that can be used to increase the field of view of a display and improve the user experience. In an embodiment, multiple depth planes are produced by the display, resulting in generation of volumetric images. These and other embodiments of the invention along with many of its advantages and features are described in more detail in conjunction with the text below and attached figures.

DETAILED DESCRIPTION OF SPECIFIC EMBODIMENTS

The present invention relates generally to methods and systems related to projection display systems including wearable displays. More particularly, embodiments of the present invention provide methods and systems that have an extended field of view in comparison with conventional systems. The invention is applicable to a variety of applications in computer vision and image display systems and light field projection systems, including stereoscopic systems, systems that deliver beamlets of light to the retina of the user, or the like.

Embodiments of the present invention utilize an pupil expander assembly including an exit pupil expander (EPE) that typically defines the field of view of the pupil expander assembly. Although increasing the lateral dimensions of the EPE could increase the field of view, other optical elements in the pupil expander assembly, including the orthogonal pupil expander (OPE) typically constrain the amount of light that can be delivered to the EPE. For example, increasing the size of the EPE by 10% may not result in an increase in the field of view by 10% since, for example, the OPE may already be delivering light to the EPE in an efficient manner. In other words, if the OPE is optimized for light delivery, increases in the size of the EPE may not result in a matching increase in the field of view. As an example, for a waveguide structure, total internal reflection (TIR) will limit the angles at which light can be injected into the waveguide, preventing an increase in EPE size from producing a matching increase in field of view. Moreover, although the selection of materials, for example, with a higher index of refraction, can improve the angular range over which injected light can be utilized, cost, weight, and other factors place practical limits on material choices.

Accordingly, some embodiments of the present invention utilize multiple OPEs to deliver light to a common EPE, thereby increasing the field of view provided by the common EPE. As a result, some embodiments of the present invention provide unique solutions since they achieve an increase in the field of view of the EPE, not as a result of increasing the size of the EPE, but through the use of multiple OPEs coupled to the EPE. Other embodiments utilize multiple EPEs to increase the field of view provided to the user. As described herein, the use of multiple OPEs provides opportunities to increase the size of the EPE, which can result in additional increases in the field of view.

Figure 1:
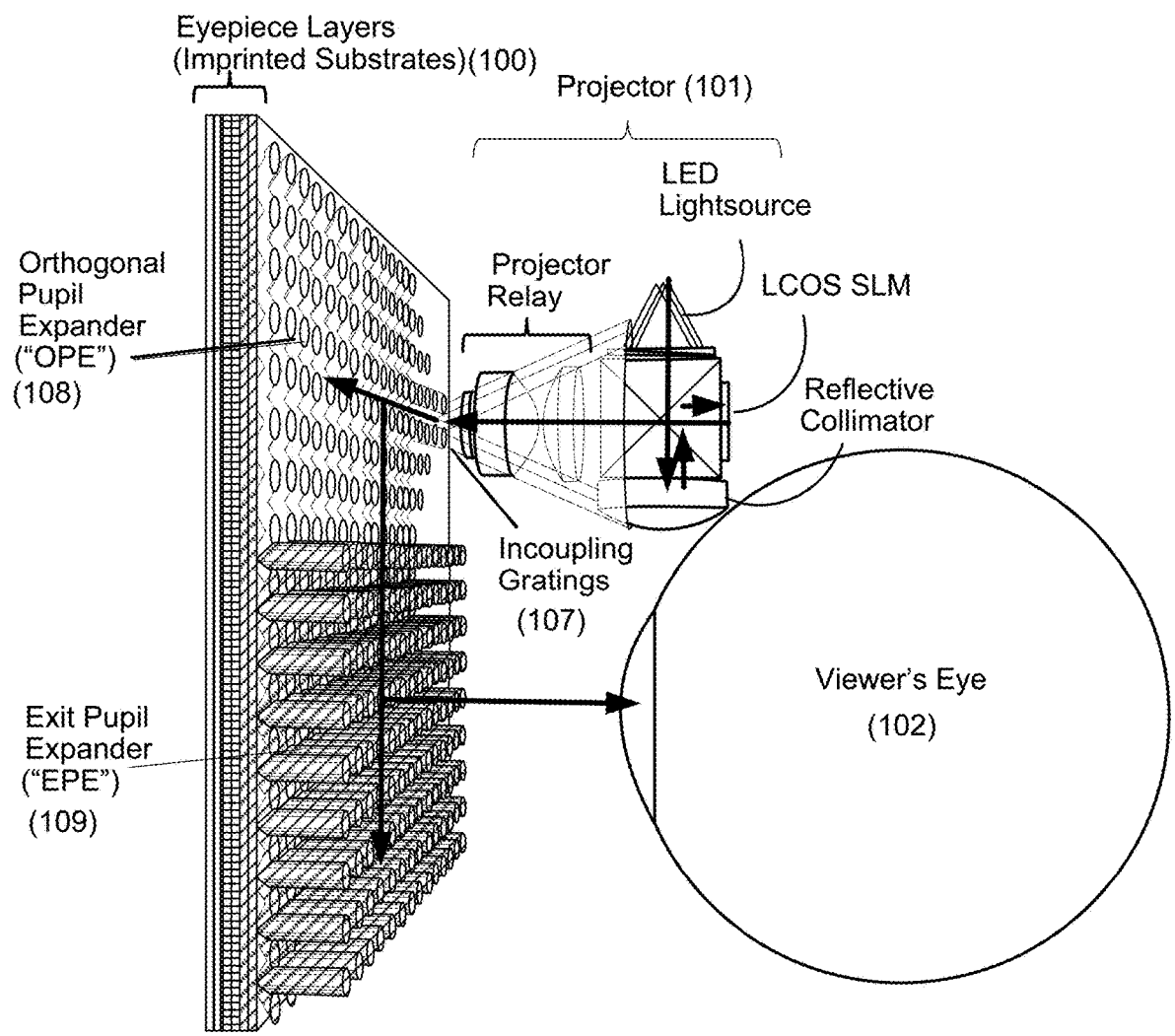
FIG. 1 illustrates schematically the light paths in a viewing optics assembly (VOA) that may be used to present a digital or virtual image to a viewer, according to an embodiment of the present invention.

FIG. 1 illustrates schematically the light paths in a viewing optics assembly (VOA) that may be used to present a digital or virtual image to a viewer, according to an embodiment of the present invention. The VOA includes a projector 101 and an eyepiece 100 that may be worn around a viewer's eye. In some embodiments, the projector 101 may include a group of red LEDs, a group of green LEDs, and a group of blue LEDs. For example, the projector 101 may include two red LEDs, two green LEDs, and two blue LEDs according to an embodiment. The eyepiece 100 may include one or more eyepiece layers. In one embodiment, the eyepiece 100 includes three eyepiece layers, one eyepiece layer for each of the three primary colors, red, green, and blue. In another embodiment, the eyepiece 100 may include six eyepiece layers, i.e., one set of eyepiece layers for each of the three primary colors configured for forming a virtual image at one depth plane, and another set of eyepiece layers for each of the three primary colors configured for forming a virtual image at another depth plane. In other embodiments, the eyepiece 100 may include three or more eyepiece layers for each of the three primary colors for three or more different depth planes. Each eyepiece layer comprises a planar waveguide and may include an incoupling grating 107, an orthogonal pupil expander (OPE) region 108, and an exit pupil expander (EPE) region 109.

Still referring to FIG. 1, the projector 101 projects image light onto the incoupling grating 107 in an eyepiece layer 100. The incoupling grating 107 couples the image light from the projector 101 into the planar waveguide propagating in a direction toward the OPE region 108. The waveguide propagates the image light in the horizontal direction by total internal reflection (TIR). The OPE region 108 of the eyepiece layer 100 also includes a diffractive element that multiplies and redirects image light from the incoupling grating propagating in the waveguide toward the EPE region 109. In other words, the OPE multiplies beamlets in an orthogonal direction that are delivered to the different portions of the EPE. The EPE region 109 includes an diffractive element that outcouples and directs a portion of the image light propagating in the waveguide in a direction approximately perpendicular to the plane of the eyepiece layer 100 toward a viewer's eye 102. In this fashion, an image projected by projector 101 may be viewed by the viewer's eye 102.

As described above, image light generated by the projector may include light in the three primary colors, namely blue (B), green (G), and red (R). Such image light can be separated into the constituent colors, so that image light in each constituent color may be coupled to a respective waveguide in the eyepiece.

Figure 2:
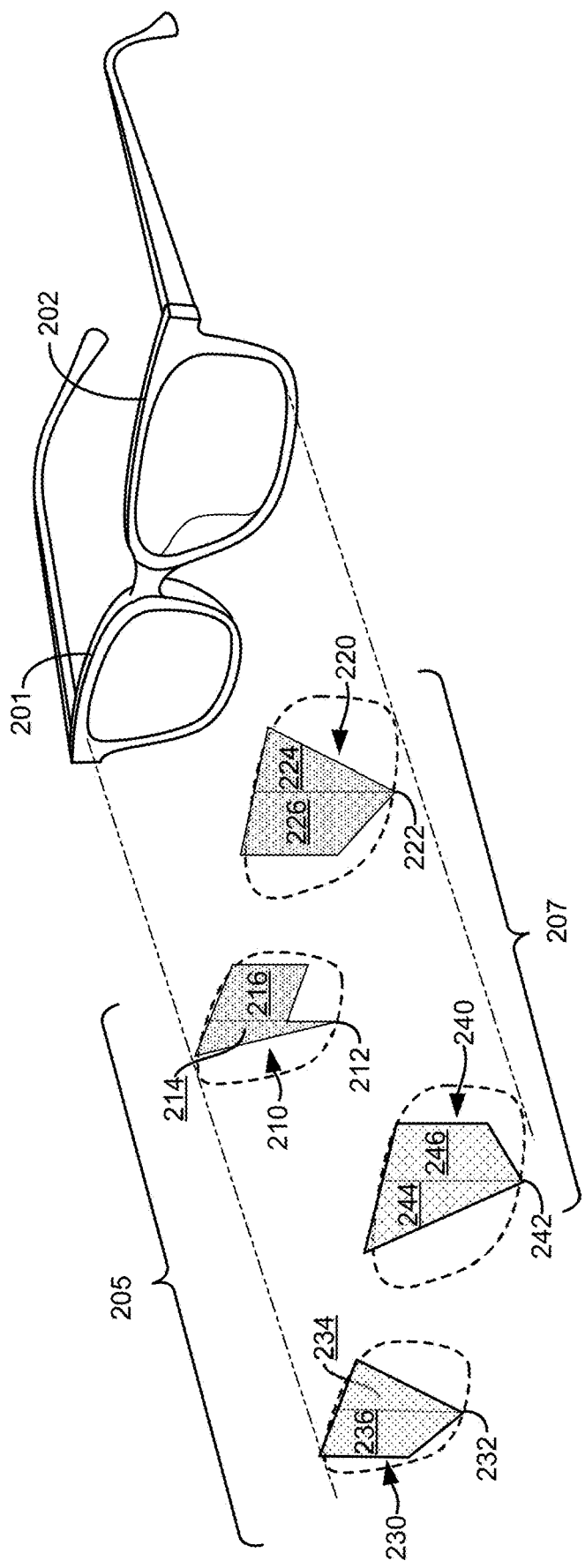
FIG. 2 is a simplified perspective diagram illustrating glasses including a waveguide display optically coupled to two projectors according to an embodiment of the present invention.

FIG. 2 is a simplified perspective diagram illustrating glasses including waveguide displays optically coupled to two projectors according to an embodiment of the present invention. As discussed herein, the total field of view of the system can be increased through the use of multiple projectors, for example, multiple fiber scanning projectors, to drive a waveguide display associated with each eye of a user. A first waveguide display 205 utilizes two pupil expander assemblies, which can include an input coupling grating, an orthogonal pupil expander, and an exit pupil expander: a first right pupil expander assembly 210 and a second right pupil expander assembly 230. A second waveguide display 207 utilizes two additional pupil expander assemblies: a first left pupil expander assembly 220 and a second left pupil expander assembly 240.

As illustrated by the glasses shown from the front perspective view in FIG. 2, the right lens frame 201 of the glasses includes a first right pupil expander assembly 210 that includes an input coupling element 212, which may be implemented as an input coupling grating (ICG). For purposes of clarity, the input coupling element 212 will be referred to as an ICG herein, although other diffractive structures can be utilized by embodiments of the present invention. The pupil expander assembly 210 in the right lens frame 201 of the glasses also includes an orthogonal pupil expander (OPE) 214, and an exit pupil expander (EPE) 216. In the design illustrated in FIG. 2, the light from a projector (not shown) impinges on the ICG 212 at the lower rim of the right lens frame 201, although this is not required by the present invention and other input locations can be utilized. Light coupled into the first pupil expander assembly 210 at the ICG 212 propagates through the OPE 214 and is coupled into the EPE 216. After propagation toward the nasal region of the lens frame, the light is output from the EPE 216 toward the right eye of the viewer or user as described more fully below.

In contrast with some pupil expander assemblies in which the output from the EPE is at normal incidence with respect to the plane of the pupil expander assembly, EPE 216 is designed such that the output light exits the EPE 216 at a non-normal angle. As an example, the light can exit at an angle of 15° to the normal such that the light exits the EPE 216 in a direction moving from the nasal region toward the center of the lens frame 201. Thus, EPE 216 will direct light from the nasal region of the lens frame toward the user's right eye, creating a left side field of view, for example, a field of view of 30°×40° (lateral by vertical) on the left side of the user's visual field.

The left lens frame 202 of the glasses also includes a first left pupil expander assembly 220 that includes an input coupling element 222, which may be implemented as an input coupling grating (ICG). For purposes of clarity, the input coupling element 222 will be referred to as an ICG herein, although other diffractive structures can be utilized by embodiments of the present invention. The first left pupil expander assembly 220 in the left lens frame 202 of the glasses also includes an orthogonal pupil expander (OPE) 224, and an exit pupil expander (EPE) 226. In the design illustrated in FIG. 2, the light from a second projector (not shown) impinges on the ICG 222 at the lower rim of the right lens frame 202, although this is not required by the present invention and other input locations can be utilized. Light coupled into the first left pupil expander assembly 220 at the ICG 222 propagates through the OPE 224 and is coupled into the EPE 226. After propagation toward the nasal region of the lens frame, the light is output from the EPE 226 toward the left eye of the viewer or user.

In a manner similar to first right pupil expander assembly 210, but in a mirror-image configuration, EPE 226 is designed such that the output light exits the EPE 226 at a non-normal angle, for example, an angle of 15° to the normal. Accordingly, the light exits the EPE 226 in a direction moving from the nasal region toward the center of the lens frame 202. As an example, control of the angle of emission can be achieved by varying the grating periodicity or pitch. Thus, EPE 226 will direct light from the nasal region of the lens frame toward the user's left eye, creating a right side field of view, for example, a field of view of 30°×40° (lateral by vertical) on the right side of the user's visual field.

An additional set of pupil expander assemblies is provided in the lens frames as illustrated in FIG. 2. In the right lens frame 201, second right pupil expander assembly 230 includes ICG 232, OPE 234, and EPE 236. Light from a third projector (now shown) impinges on the ICG 232 at the lower rim of the right lens frame 201, although this is not required by the present invention and other input locations can be utilized. Light coupled into the second right pupil expander assembly 230 at the ICG 232 propagates through the OPE 234 and is coupled into the EPE 236. After propagation toward the peripheral region of the lens frame, the light is output from the EPE 236 toward the viewer or user.

Light exits the EPE 236 at a non-normal angle, for example, an angle of 15° to the normal, such that the light exits the EPE 236 in a direction moving from the peripheral region toward the center of the lens frame 201. Thus, EPE 236 will direct light from the peripheral region of the lens frame toward the user's right eye, creating a right side field of view, for example, a field of view of 30°×40° (lateral by vertical) on the right side of the user's visual field.

The left lens frame 202 of the glasses also includes a second left pupil expander assembly 240 that includes ICG 242, OPE 244, and EPE 246. Light from a fourth projector (now shown) impinges on the ICG 242 at the lower rim of the left lens frame 202, although this is not required by the present invention and other input locations can be utilized. Light coupled into the second left pupil expander assembly 240 at the ICG 242 propagates through the OPE 244 and is coupled into the EPE 246. After propagation toward the peripheral region of the lens frame, the light is output from the EPE 246 toward the viewer or user.

In a manner similar to second right pupil expander assembly 230, but in a mirror-image configuration, EPE 246 is designed such that the output light exits the EPE 246 at a non-normal angle, for example, an angle of 15° to the normal. Accordingly, the light exits the EPE 246 in a direction moving from the peripheral region toward the center of the lens frame 202. Thus, EPE 246 will direct light from the peripheral region of the lens frame toward the user's left eye, creating a left side field of view, for example, a field of view of 30°×40° (lateral by vertical) on the left side of the user's visual field.

The combination of the first right pupil expander assembly 210 and the second right pupil expander assembly 230 provide the user's right eye with an extended field of view that combines the individual fields of view produced by each eyepiece. As an example, the left side of the right field of view can be aligned with the right side of the left field of view to provide a tiled display. In this configuration, peripheral portions of the fields of view abut each other without overlapping to define a common boundary. In embodiments in which EPE 216 and EPE 236 provide a field of view of 30°×40°, the combined field of view can be 60°×40°, effectively doubling the field of view available to the user. Similar increases in the field of view are achieved for the left eye. In addition to this configuration in which the fields of view are tiled with no overlap, other configurations are included within the scope of the present invention as described more fully herein.

Figure 3:
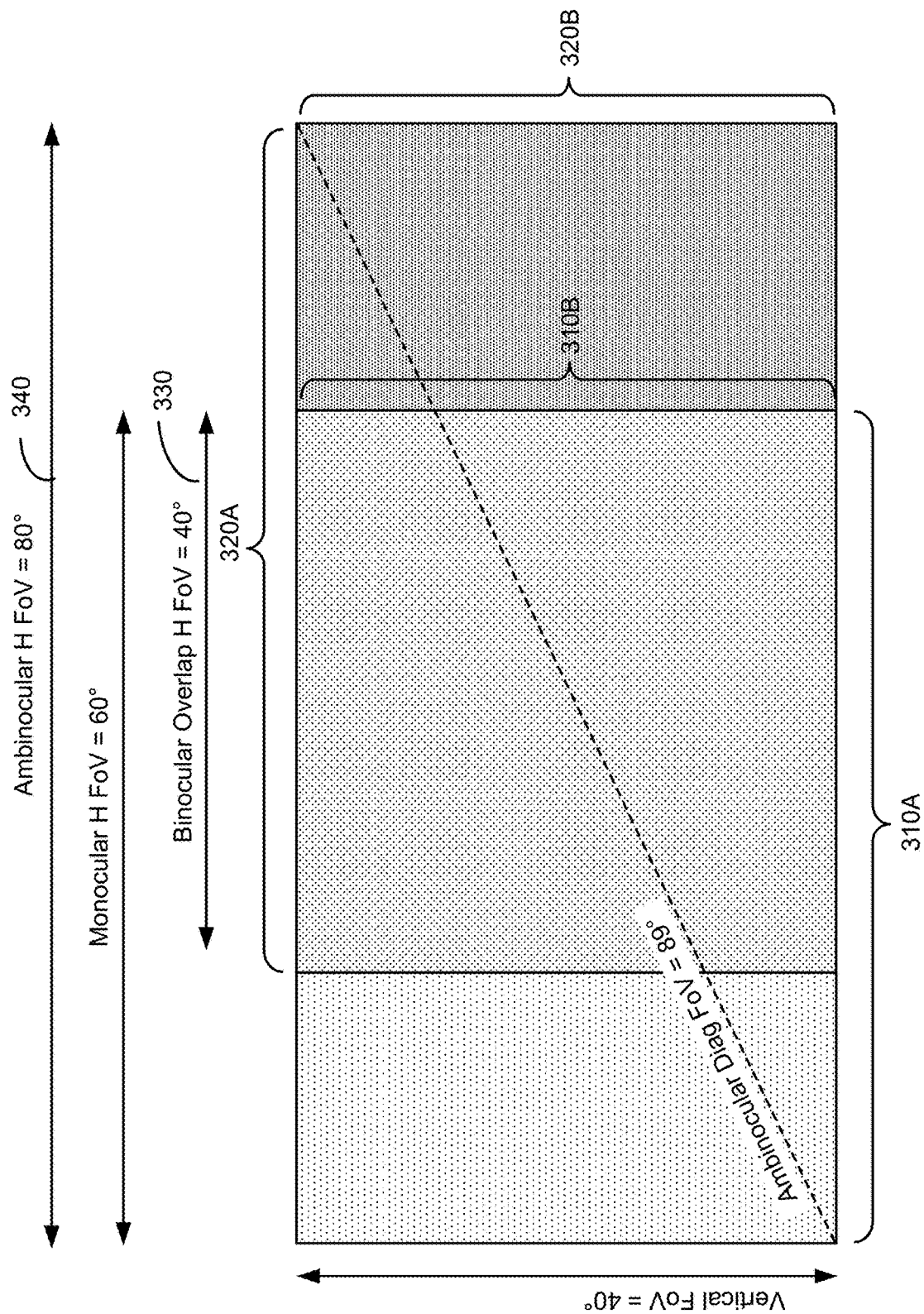
FIG. 3 is a simplified schematic diagram illustrating binocular field of view overlap according to an embodiment of the present invention.

FIG. 3 is a simplified schematic diagram illustrating binocular field of view overlap according to an embodiment of the present invention. In FIG. 3, the expanded field of view associated with the left eye is 60°×40° (lateral×vertical) and illustrated by the left field of view 310 (310A for the horizontal 60° extent and 310B for the 40° vertical extent). The expanded field of view associated with the right eye is also 60°×40° (lateral×vertical) and illustrated by right field of view 320 (320A for the horizontal 60° extent and 320B for the 40° vertical extent). A binocular overlap region of 40° with 20° of non-overlapped field of view at the peripheral edges is achieved in this implementation. This implementation enables binocular processing of data to occur in the inner 40° of the field of view 330, which research indicates is the region in which the majority of binocular processing occurs. Although a 40° binocular overlap is provided in this example, additional overlap, including complete overlap, or reduced overlap can be implemented. One of ordinary skill in the art would recognize many variations, modifications, and alternatives.

As illustrated in FIG. 3, an ambinocular (i.e., total) field of view 340 of 80°×40° is provided across both eyes, resulting in a diagonal ambinocular field of view of 89°. Although two overlapping fields of view are illustrated in FIG. 3, the present invention is not limited to this particular implementation and other numbers of fields of view can be tiled or overlapped, or combinations thereof. For example, two or more fields of view could be overlapped in a central region and two or more additional fields of view could be tiled in a peripheral region. One of ordinary skill in the art would recognize many variations, modifications, and alternatives.

Figure 4A:
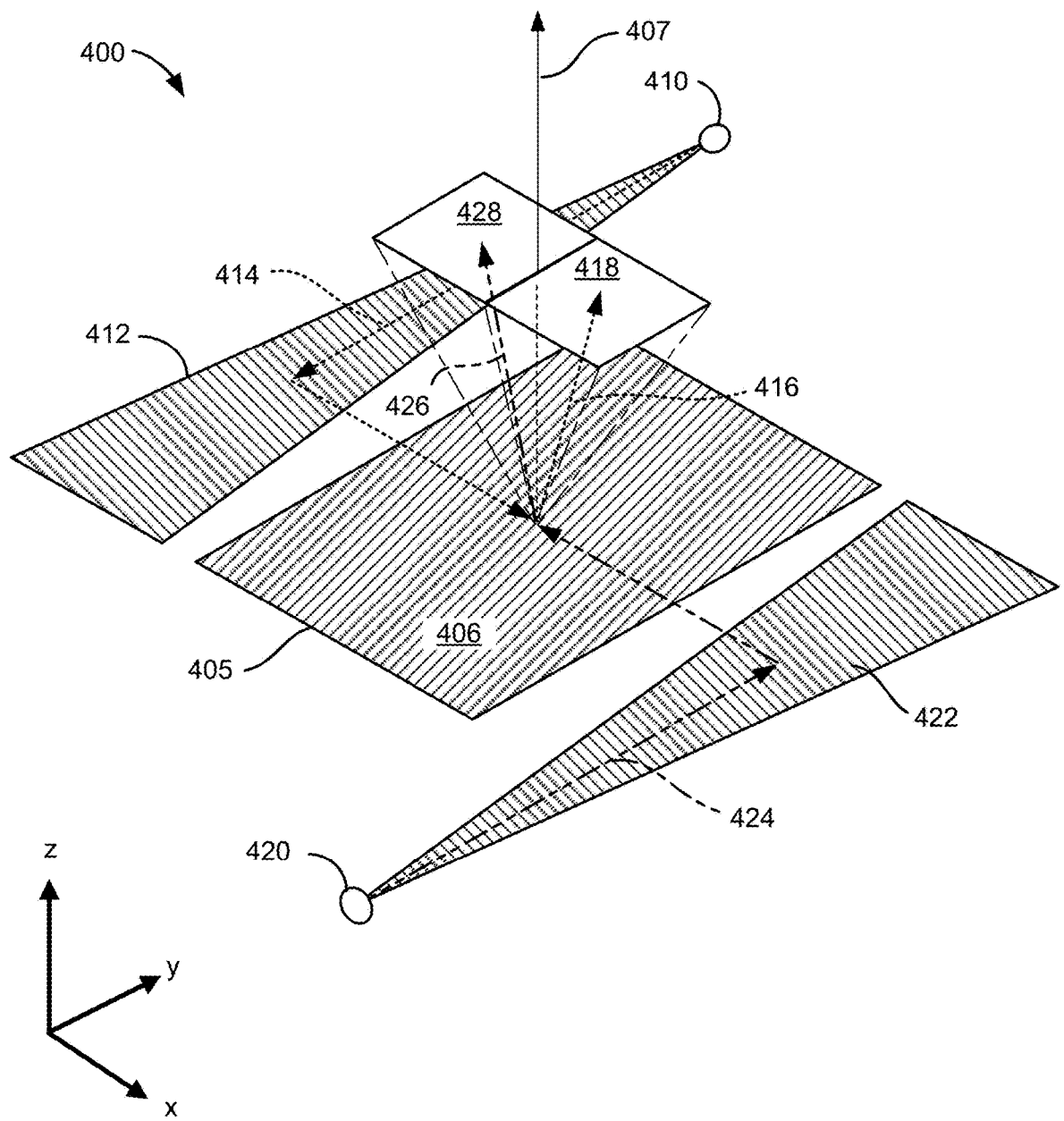
FIG. 4A is a simplified perspective diagram illustrating a waveguide display producing an extended field of view according to an embodiment of the present invention.

FIG. 4A is a simplified perspective diagram illustrating a waveguide display 400 producing an extended field of view according to an embodiment of the present invention. A shared EPE 405, which can also be referred to as a diffractive output element, is provided as an element of the waveguide display that works in conjunction with light provided by two more projectors. As illustrated in FIG. 4A, two OPEs disposed on opposite sides of the shared EPE in some implementations such that the first OPE is positioned at a first distance from the central normal along a first direction (e.g., the x-direction) and the second OPE is positioned at a second distance from the central normal along the opposite direction (e.g., the negative x-direction). In some embodiments, the size of the EPE can be increased in comparison with conventional EPEs that receive light from a single OPE. The shared EPE 405 is substantially planar and is characterized by an emission surface 406. Central normal 407 is a vector that is normal to the emission surface 406 and centered at the center of the shared EPE 405. In the embodiment illustrated in FIG. 4A, the central normal is aligned with the z-axis. As described more fully below, two fields of view are generated that are displaced with respect to the central normal. As a result, image data associated with a first projector can be projected to form a first field of view displaced in a first direction with respect to the central normal and image data associated with a second projector can be projected to form a second field of view displaced in a second and opposite direction with respect to the central normal.

A first ICG 410 receives light from a first projector (not shown) and directs the light into the plane of the waveguide along propagation path 414. As the light propagates through first OPE 412, the light is diffracted toward shared EPE 405. A second ICG 420 receives light from a second projector (not shown) and direct the light into the plane of the waveguide along propagation path 424. As the light propagates through second OPE 422, the light is diffracted toward shared EPE 405.

EPE 405 is designed such that light entering the EPE from first OPE 412 is diffracted to form a first emission frustum 418 centered on first output path 416 and light entering the EPE from second OPE 422 is diffracted to form a second emission frustum 428 centered on second output path 426. As illustrated in FIG. 4A, the output paths can lie along directions that are non-normal to the emission surface of the EPE. As an example, first output path 426 can be directed at 15° to one side of the normal to the emission surface of the EPE and second output path 428 can be directed at −15° to the normal to the emission surface of the EPE. In this implementation, the first field of view and the second field of view are tiled, with the central normal 407 passing through a boundary of each of the first field of view and the second field of view. Referring to FIG. 4A, the first emission frustum 418, which defines the first field of view, and the second emission frustum 428, which defines the second field of view, have one side of their field of view aligned with the normal to the emission surface and the opposing side of their field of view oriented at ±30° to the normal, respectively.

Thus, as illustrated in FIG. 4A, a shared EPE can be used to increase the total field of view by combining the field of view associated with a first projector with a second field of view associated with a second projector. In the embodiment illustrated in FIG. 4A, the fields of view are tiled with no overlap, but in other embodiments, a region of central binocular overlap as illustrated in FIG. 3 can be provided as appropriate to the particular application. Although it is not required by the present invention, in some embodiments, the range of angles associated with the multiple projectors and OPEs can be increased, thereby increasing the size of the combined field of view. One of ordinary skill in the art would recognize many variations, modifications, and alternatives.

Figure 4B:
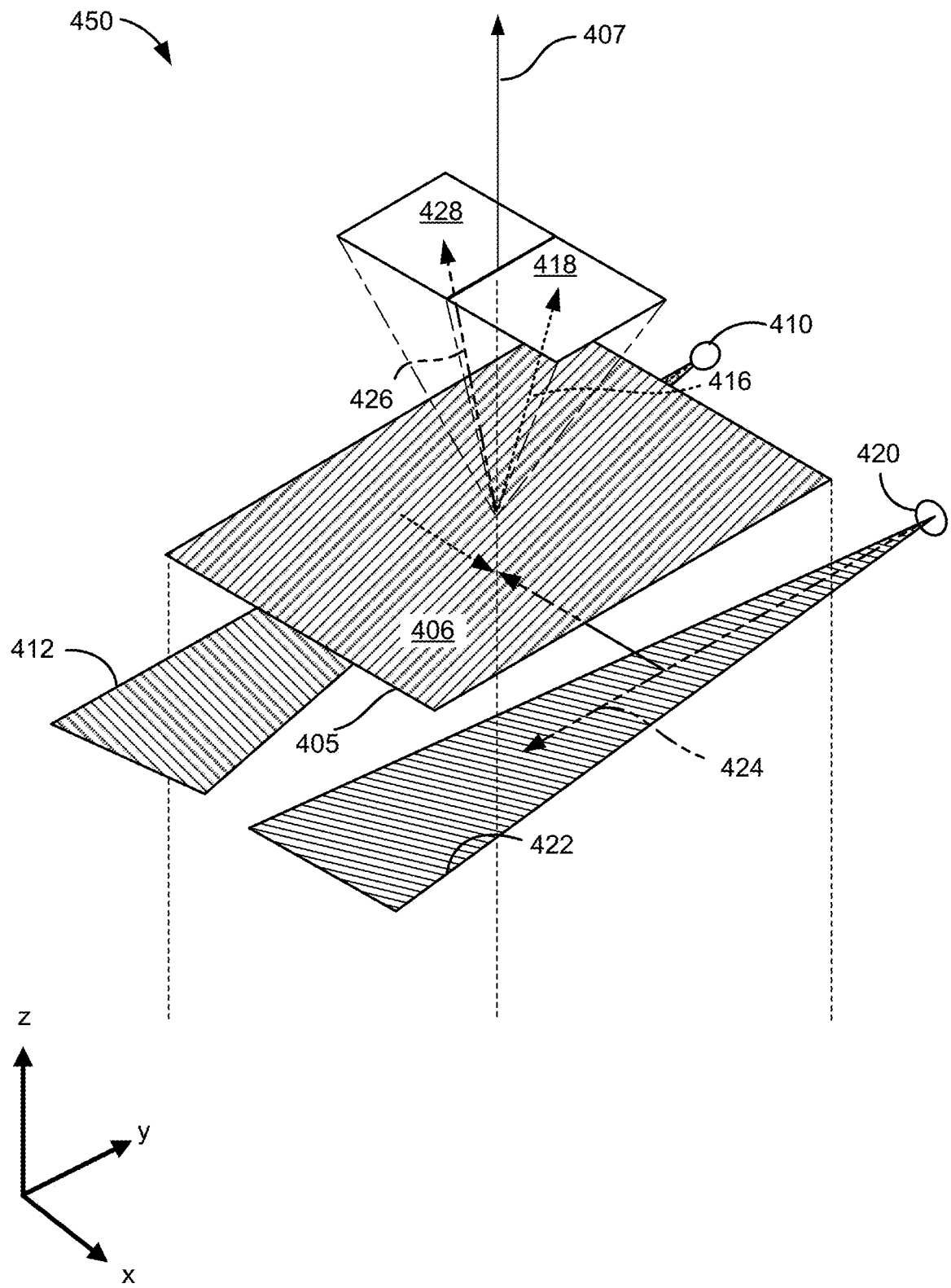
FIG. 4B is a simplified exploded perspective diagram illustrating a waveguide display with overlapping elements according to an embodiment of the present invention.

FIG. 4B is a simplified exploded perspective diagram illustrating a waveguide display with overlapping elements according to an embodiment of the present invention. The waveguide display 450 illustrated in FIG. 4B shares some similarities with the waveguide display illustrated in FIG. 4A and the description provided in relation to FIG. 4A is applicable to FIG. 4B as appropriate. As illustrated in the exploded view shown in FIG. 4A, the OPEs 412 and 422 overlap spatially with the shared EPE 405, with the OPEs positioned at a first z-dimension and the shared EPE positioned at a second z-dimension.

In the embodiment illustrated in FIG. 4B, light received at ICGs 410 and 420 is directed into the plane of the waveguide. The ICGs can be positioned adjacent each other in the x-y plane, partially overlapped, or completely overlapped. By rotating the orientation and/or the pitch of the diffractive elements defining the ICGs, the angle at which light propagates in the x-y plane can be modified. As a result, by modifying the orientation of diffraction gratings in the ICGs, the field of view of two projectors mounted in parallel can be angularly shifted with respect to each other. By modifying the grating pitch, a grating with a higher frequency pitch can deflect the light from the projector at a different angle, enabling use of projectors with different orientations. It should be appreciated that these variations discussed in relation to FIG. 4B are applicable to the embodiments illustrated in FIG. 4A and FIG. 6 as appropriate.

Propagation path 424 is illustrated for OPE 422. A similar propagation path for OPE 412 is present, but obscured by the shared EPE 405. As the light propagates through OPEs, the light is diffracted toward shared EPE 405. As illustrated in FIG. 4B, the ICGs and OPEs are oriented to direct light in the same direction in the plane of the waveguide, i.e., the negative y-direction. Because light is propagating the same direction in the OPEs, the orientation of the grating lines will be different in the OPEs (e.g., a mirror image) in order to direct light toward the shared EPE. If OPE 412 and OPE 422 are positioned such that they overlap in the x-y plane, the superposition of the diffraction gratings of each OPE can form a diamond shaped diffraction pattern resulting from the overlap of the mirror image grating lines of each OPE. In an embodiment, the diffractive elements (e.g., diamond pattern grating lines) for the OPEs can be formed on one surface of the waveguide layer and the diffractive elements (e.g., grating lines) for the shared EPE can be formed on the opposing side of the waveguide layer.

In comparison, in FIG. 4A, ICG 410 directs light in the negative y-direction and ICG 420 directs light in the positive y-direction. Accordingly, in this embodiment, the orientation of the grating lines can be aligned in order to direct the diffracted light toward the shared EPE.

Figure 5A:
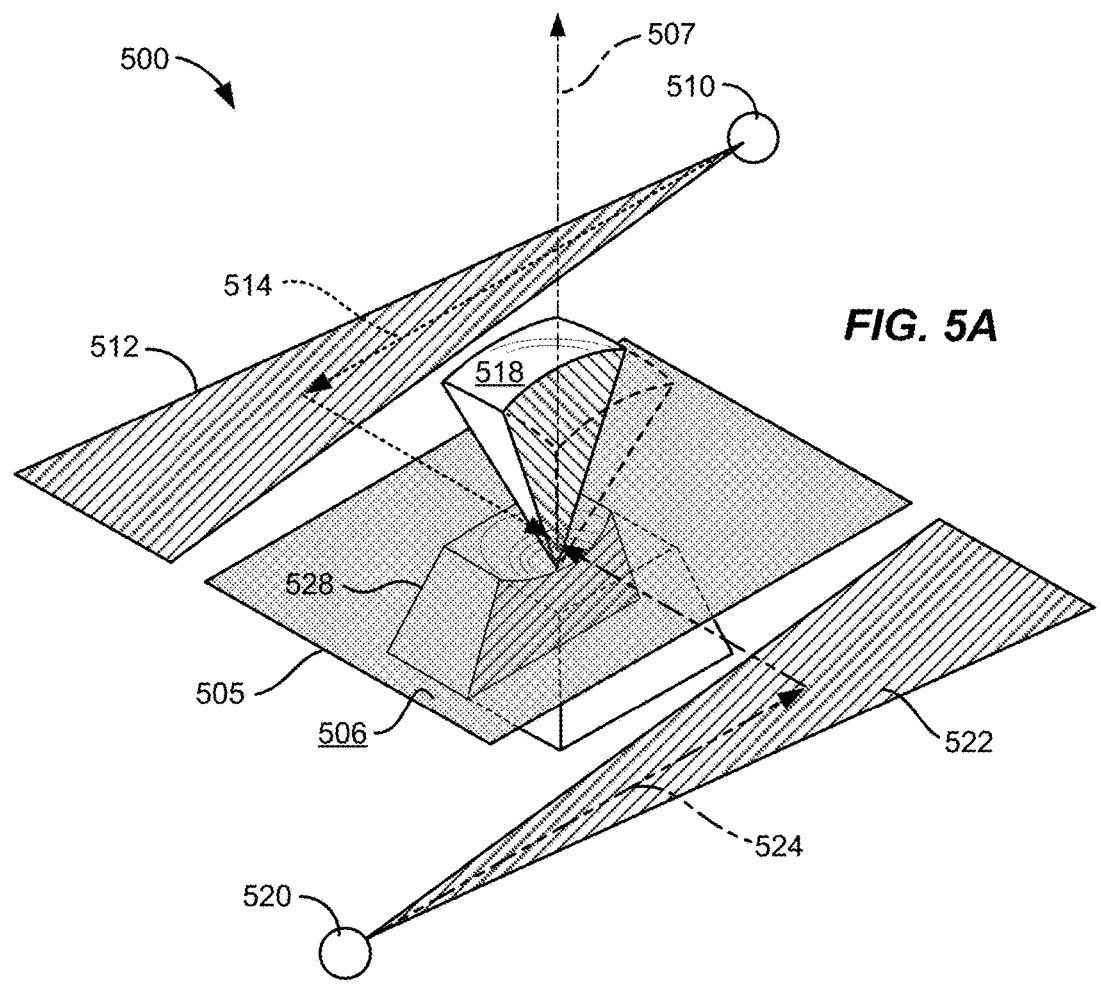
FIG. 5A is a simplified perspective diagram illustrating a waveguide display producing multiple depth planes according to an embodiment of the present invention.

FIG. 5A is a simplified perspective diagram illustrating a waveguide display producing multiple depth planes according to an embodiment of the present invention. The waveguide display 500 illustrated in FIG. 5A shares some similarities with the waveguide display illustrated in FIG. 4A and the description provided in relation to FIG. 4A is applicable to FIG. 5A as appropriate.

A shared EPE 505 is provided on the waveguide display that works in conjunction with light provided by two more projectors. A first ICG 510 receives light from a first projector (not shown) and directs the light into the plane of the waveguide along propagation path 514. As the light propagates through first OPE 512, the light is diffracted toward shared EPE 505. A second ICG 520 receives light from a second projector (not shown) and directs the light into the plane of the waveguide along propagation path 524. As the light propagates through second OPE 522, the light is diffracted toward shared EPE 505.

EPE 505 is designed to include optical power. Accordingly, light entering the EPE from first OPE 512 is diffracted to form a first emission frustum 518 that has a diverging wavefront. Central ray 507 of the first emission frustum, which is also the normal to surface 506 of EPE 505, is illustrated as directed away from the EPE in the direction of a user. In FIG. 5A, the first emission frustum 518 is illustrated as being positioned in the center of the EPE, but it will be evident to one of skill in the art that the emission originates from across the surface 506 of EPE 505 and that the illustrated frustum is only limited to the center region for purposes of clarity.

As illustrated in FIG. 5A, the first emission frustum 518 is directed along a direction normal to the emission surface of the EPE (i.e., the central ray 507 is normal to the emission surface) and a virtual source of the first emission frustum 518 is located at a position below the plane of the waveguide and EPE 505. Although the light emitted from the EPE is illustrated as being normal to the emission surface, this is not required by the present invention and other emission angles are included within the scope of the present invention.

Light entering the EPE from second OPE 522 is diffracted to form a second emission frustum 528 that has a converging wavefront. The central ray of the second emission frustum 528 is also illustrated as directed away from the EPE in the direction of a user. As further illustrated in FIG. 5A, the focal point of the second emission frustum is located in front of the plane of the waveguide or the emission surface of the EPE. In the illustrated embodiment, both emission frustums are centered on a normal to the emission surface of the waveguide and can be aligned with the center of the EPE and/or the center of the waveguide display. Accordingly, although the second emission frustum 528 is illustrated as centered on the EPE, it will be evident to one of skill in the art that the emission originates from across the EPE and that the illustrated frustum is only limited to the center region for purposes of clarity.

Figure 5B:
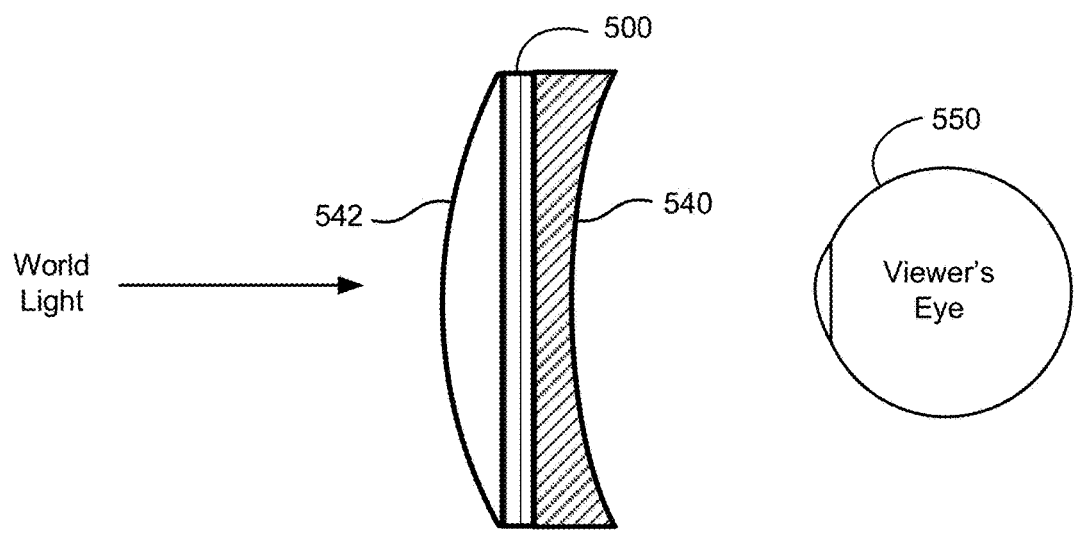
FIG. 5B is a simplified side view illustrating integration of lenses with the waveguide display illustrated in FIG. 5A.

FIG. 5B is a simplified side view illustrating integration of lenses with the waveguide display illustrated in FIG. 5A. The waveguide display 500 emits light toward eye 550 with one diverging beam having negative optical power (e.g., an optical power of −0.33 diopters) and one converging beam having positive optical power (e.g., an optical power of +0.33 diopters). Lens 540 is integrated with the waveguide display and can be either a negative or positive lens. In the implementation illustrated in FIG. 5B, the lens 540 is a negative lens (e.g., having an optical power of −0.66 diopters). As the first emission frustum 518 passes through lens 540, the optical power will be modified, for example, to −1.0 diopters, and as the second emission frustum 528 passes through lens 540, the optical power will be modified, for example, to −0.33 diopters. As a result, in this example, the first emission frustum will be associated with a depth plane of 1 meter and the second emission frustum will be associated with a depth plane of 3 meters.

A second lens 542, which can be a positive lens, can be integrated with the waveguide display to compensate for the power of lens 540. As illustrated in FIG. 5B, a positive lens with an optical power equal to the absolute value of the optical power of lens 540 is used so that light from the world passes to the eye 550 of the user without altering the view from the world. The use of lenses 540 and 542 can encapsulate the waveguide display to provide for reliability. Additionally, one or more of the lenses can be modified to provide a prescription that is appropriate for the user.

Although refractive lenses 540 and 542 are illustrated in FIG. 5B, embodiments of the present invention are not limited to these implementations and holographic elements, diffractive surfaces, meta-surfaces, and the like can be utilized in accordance with embodiments of the present invention. For example, lens 540 could be a diffractive surface, a meta-surface, or the like. Moreover, one of more of the lenses illustrated in FIG. 5B can also be implemented using diffractive structures or combinations of diffractive and/or refractive structures. An example would be a diffractive structure to compensate for chromatic aberration and a refractive structure to focus the light received from the world. One of ordinary skill in the art would recognize many variations, modifications, and alternatives.

In order to provide multiple depth planes for an RGB system, three waveguide display devices can be utilized, each providing two depth planes at one of the RGB colors. One of ordinary skill in the art would recognize many variations, modifications, and alternatives.

Figure 6:
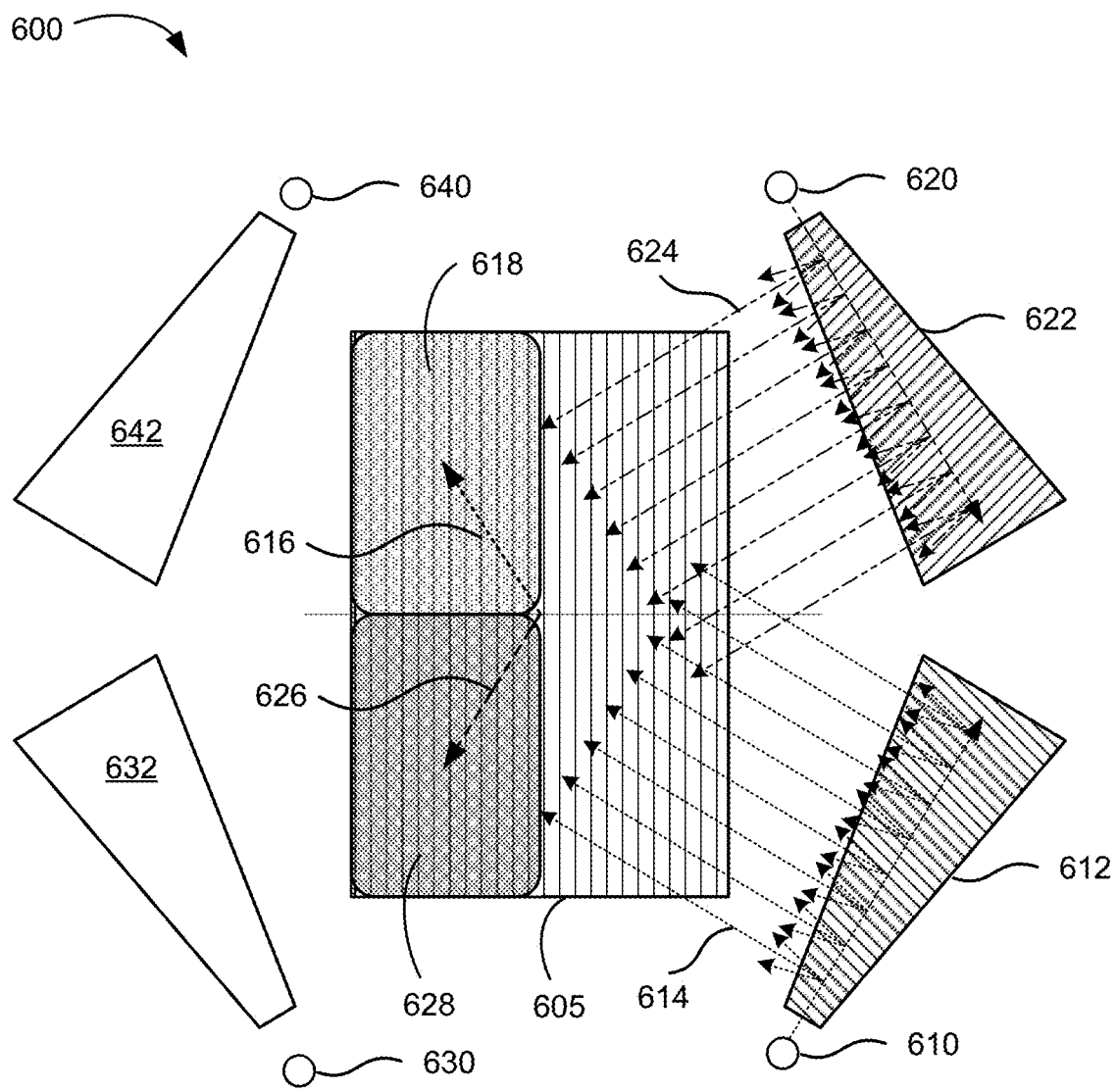
FIG. 6 is a simplified schematic plan view illustrating a waveguide display producing a tiled field of view according to an embodiment of the present invention.

FIG. 6 is a simplified schematic plan view illustrating a waveguide display producing a tiled field of view according to an embodiment of the present invention. The waveguide display illustrated in FIG. 6 shares some similarities with the waveguide display illustrated in FIG. 4 and the description provided in relation to FIG. 4 is applicable to FIG. 6 as appropriate.

Referring to FIG. 6, four projectors (not shown) are used to drive shared EPE 605. Four ICGs 610, 620, 630, and 640 are used direct light from the corresponding projector to four OPEs 612, 622, 632, and 642. For purposes of clarity, only the operation of OPEs 612 and 622 will be discussed since the operation of OPEs 632 and 642 are similar in a mirror-image fashion.

As light propagates through OPE 612, the light is diffracted toward shared EPE 605 at a first angular offset. As light propagates through OPE 622, the light is diffracted toward shared EPE 605 at a second angular offset. Accordingly, light from OPE 612 is diffracted in the shared EPE to form a first emission frustum 618 centered on first output path 616 and light entering the shared EPE from OPE 622 is diffracted to form a second emission frustum 628 centered on second output path 626. It should be noted that although the emission frustrums are illustrated as overlapping with one corner of the shared EPE, light will be coupled out of the EPE across the entirety of the EPE to form the four emission frustrums that are illustrated. Referring to FIG. 4A, the relation of the emission frustrums to the EPE illustrated in FIG. 6 can be appreciated, with light coupled out of the EPE across the EPE forming one of the four illustrated emission frustrums corresponding to each of the corresponding OPEs. Thus, the emission frustrums correlate with the field of view of the corresponding OPE, resulting in the tiled output characterized by an extended field of view in comparison to the field of view of the individual OPEs. Accordingly, although the first emission frustum 618 is illustrated as positioned over the top left quadrant of shared EPE 605, this is not intended to imply that the light contained in the first emission frustum originates from only the top left quadrant of the shared EPE.

Although not visible at the scale of FIG. 6, diffractive features, e.g., grating teeth, are illustrated by the shading of OPE 612 and OPE 622 and are oriented to diffract light toward shared EPE 605. Although light from OPE 612 is illustrated as diffracted in the shared EPE to form a first emission frustum 618 centered on first output path 616, in other embodiments, light is diffracted in the shared EPE to form an emission frustum that is adjacent to the corresponding OPE. In this embodiment, the light would be emitted with the following correspondence: OPE 612 corresponding to bottom right frustum, OPE 622 corresponding to the top right frustum, OPE 632 corresponding to frustum 628, and OPE 642 corresponding to frustum 618. In this configuration, the propagation path in the shared EPE will be reduced, potentially improving optical performance including image brightness.

Referring to FIG. 6, OPE 612 and OPE 622 are spatially separated from each other in the x-y plane. In other embodiments, OPE 612 and OPE 622 are positioned such that the inner edge of the OPE is aligned with the outer edge of EPE 605. Thus, the gap between the various elements is not required, but can be utilized as appropriate. In yet other embodiments, an overlapping geometry is utilized in which portions of a first OPE are disposed at the same x-y position as portions of the second OPE. In this overlapping geometry, diffraction gratings associated with the first OPE as well as diffraction gratings associated with the second OPE can be formed on one side or surface of a waveguide layer. In other embodiments, these diffraction gratings can be positioned at different z-dimensions. Moreover, although OPE 612 and OPE 622 are spatially separated from the shared EPE 605 in the x-y plane, in other embodiments, portions of one or more of the OPEs can be disposed at the same x-y position as portions of the shared EPE. In one embodiment of an overlapping geometry, portions of one or more of the OPEs are positioned at a first z-dimension and portions of the shared EPE are positioned at a second z-dimension. As an example, diffraction gratings associated with the OPE can be formed on one side of a waveguide layer while diffraction gratings associated with the shared EPE can be formed on the opposite side of the waveguide layer. In other embodiments, the diffraction gratings for portions of the OPEs and portions of the shared EPE can be formed on a same surface. Similar layouts are applicable to OPE 632 and OPE 642. Thus, embodiments of the present invention provide implementations in which the OPEs can overlap with one another, the OPEs can overlap with the shared EPE, or the like.

As illustrated in FIG. 6, the emission frustums can be aligned to form a tiled output having an extended field of view that combines the fields of view as illustrated. Utilizing four OPEs with shared EPE 605 enable a 2×2 tiling of the field of view, with OPE 612 providing emission frustum 618 as light is diffracted by the shared EPE to the top left, OPE 622 providing emission frustum 628 as light is diffracted by the shared EPE to the bottom left, OPE 632 providing a third emission frustum as light is diffracted by the shared EPE to the top right, and OPE 642 providing a fourth emission frustum as light is diffracted by the shared EPE to the bottom right. The fields of view can be adjacent to one another with aligned edges to provide an extended field of view defined by the sum of the individual fields of view or can be overlapped as illustrated in FIG. 3 depending on the particular application. In some embodiments, an ambinocular diagonal field of view of 134°.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A waveguide display disposed in glasses having a first lens frame having a first nasal region, a first peripheral region, and a first center disposed between the first nasal region and the first peripheral region, the waveguide display comprising:
   a first pupil expander assembly disposed in the first lens frame and operable to project a first image defined by a first field of view, wherein the first pupil expander assembly is operable to propagate light in the first pupil expander assembly toward the first nasal region and emit light at a first non-zero angle with respect to a first emission plane associated with the first pupil expander assembly; and
   a second pupil expander assembly disposed in the first lens frame adjacent the first pupil expander assembly and operable to project a second image defined by a second field of view different from the first field of view, wherein the second pupil expander assembly is operable to propagate light in the second pupil expander assembly toward the first peripheral region and emit light at a second non-zero angle with respect to a second emission plane associated with the second pupil expander assembly,
   wherein the first non-zero angle is opposite to the second non-zero angle.

2. The waveguide display of claim 1, wherein the first field of view is centered at a position between the first center and the first nasal region.

3. The waveguide display of claim 2, wherein the second field of view is centered at a position between the first center and the first peripheral region.

4. The waveguide display of claim 1, wherein the first field of view and the second field of view are tiled.

5. The waveguide display of claim 1, wherein a portion of the first field of view overlaps with a portion of the second field of view.

6. The waveguide display of claim 1, wherein the first pupil expander assembly comprises:
   a first input coupling element operable to receive image data of the first image from a first projector;
   a first orthogonal pupil expander optically coupled to the first input coupling element; and a first exit pupil expander optically coupled to the first orthogonal pupil expander.

7. The waveguide display of claim 6, wherein the second pupil expander assembly comprises:
 a second input coupling element operable to receive image data of the second image from a second projector different from the first projector;
 a second orthogonal pupil expander optically coupled to the second input coupling element; and
 a second exit pupil expander optically coupled to the second orthogonal pupil expander.

8. The waveguide display of claim 7, wherein the first input coupling element or the second input coupling element includes an input coupling grating.

9. The waveguide display of claim 1, wherein the glasses further comprises a second lens frame having a second nasal region, a second peripheral region, and a second center disposed between the second nasal region and the second peripheral region, wherein the waveguide display further comprises:
 a third pupil expander assembly disposed in the second lens frame and operable to project a third image defined by a third field of view, wherein the third pupil expander assembly is operable to propagate light in the third pupil expander assembly toward the second nasal region and emit light at a third non-zero angle with respect to a third emission plane associated with the third pupil expander assembly; and
 a fourth pupil expander assembly disposed in the second lens frame adjacent the third pupil expander assembly and operable to project a fourth image defined by a fourth field of view different from the third field of view, wherein the fourth pupil expander assembly is operable to propagate light in the fourth pupil expander assembly toward the second peripheral region and emit light at a fourth non-zero angle with respect to a fourth emission plane associated with the fourth pupil expander assembly,
 wherein the third non-zero angle is opposite to the fourth non-zero angle.

10. The waveguide display of claim 9, wherein the first non-zero angle is opposite to the third non-zero angle, and wherein the second non-zero angle is opposite to the fourth non-zero angle.

11. A waveguide display disposed in glasses having a first lens frame having a first nasal region, a first peripheral region, and a first center disposed between the first nasal region and the first peripheral region, the waveguide display comprising:
 a first pupil expander assembly disposed in the first lens frame and operable to project a first image defined by a first field of view, wherein the first pupil expander assembly comprises:
  a first input coupling element operable to receive image data from a first projector and propagate light toward the first nasal region;
  a first orthogonal pupil expander optically coupled to the first input coupling element; and
  a first exit pupil expander optically coupled to the first orthogonal pupil expander and emit light at a first non-zero angle with respect to a first emission plane associated with the first pupil expander assembly, and
 a second pupil expander assembly disposed adjacent the first pupil expander assembly and operable to project a second image defined by a second field of view different from the first field of view.

12. The waveguide display of claim 11, wherein the second pupil expander assembly is disposed in a right lens frame of the glasses.

13. The waveguide display of claim 12, wherein the first field of view is centered at a position between the first center and the first nasal region.

14. The waveguide display of claim 13, wherein the second field of view is centered at a position between the first center and the first peripheral region.

15. The waveguide display of claim 11, wherein the first field of view and the second field of view are tiled.

16. The waveguide display of claim 11, wherein a portion of the first field of view overlaps with a portion of the second field of view.

17. The waveguide display of claim 11, wherein the second pupil expander assembly comprises:
 a second input coupling element operable to receive image data from a second projector different from the first projector and to propagate light in the second pupil expander assembly toward the first peripheral region;
 a second orthogonal pupil expander optically coupled to the second input coupling element; and
 a second exit pupil expander optically coupled to the second orthogonal pupil expander and to emit light at a second non-zero angle with respect to a second emission plane associated with the second pupil expander assembly.

18. The waveguide display of claim 11, wherein the first exit pupil expander directs light toward an eye of a user of the glasses.

* * * * *